United States Patent [19]

Shidara

[11] Patent Number: 4,881,095
[45] Date of Patent: Nov. 14, 1989

[54] PROCESS FOR DEVELOPING PHOTOGRAPHED FILM AND FOR PRINTING IMAGES THROUGH DEVELOPED FILM

[75] Inventor: Shinichi Shidara, Kanagawa, Japan
[73] Assignee: Fuji Photo Film Co., Ltd., Kanagawa, Japan
[21] Appl. No.: 243,348
[22] Filed: Sep. 12, 1988

[30] Foreign Application Priority Data

Sep. 11, 1987 [JP] Japan .................. 62-226664
Sep. 11, 1987 [JP] Japan .................. 62-226665
Sep. 11, 1987 [JP] Japan .................. 62-226667

[51] Int. Cl.[4] .................. G03D 3/13; G03D 5/04; G03B 27/80
[52] U.S. Cl. .................. 354/298; 354/321; 354/325; 355/27; 355/77; 355/83
[58] Field of Search .............. 354/298, 319, 320, 321, 354/322, 324, 325; 355/27, 68, 77, 40, 41, 83, 89, 90

[56] References Cited

U.S. PATENT DOCUMENTS

| | | | |
|---|---|---|---|
| 1,895,760 | 1/1933 | Hunt .................. | 354/298 |
| 3,623,418 | 8/1969 | Ost .................. | 354/298 |
| 3,636,851 | 1/1972 | Furst .................. | 354/298 |
| 3,995,959 | 12/1976 | Shaber .................. | 354/298 |
| 4,293,211 | 10/1981 | Kaufmann .................. | 354/298 |
| 4,757,334 | 7/1988 | Volent .................. | 355/27 X |

Primary Examiner—A. A. Mathews
Attorney, Agent, or Firm—Sughrue, Mion, Zinn, Macpeak & Seas

[57] ABSTRACT

A process for developing a film having one or more photographed image areas, so that the photographed image areas are developed under an optimum condition to have appropriate densities. In the first step, a region of the film, other than the photographed image areas, is exposed with a constant quantity of light. The region exposed to the constant quantity of light is then developed prior to the development of the photographed image areas. The density of the image in the region exposed to the constant quantity of light is detected and compared with a characteristic curve showing the change in density of the developed image in terms of the quantity of exposure light to find the optimum condition for development. The photographed image areas are then developed under the thus found optimum condition. The condition for development may be controlled by varying the film feed rate, the concentration of the developing reagent in the developing liquid, the quantity of the developing liquid supplied to contact with the film or by changing the temperature of the developing liquid. An additional region exposed to the constant quantity of light may be provided and used for setting the optimum condition for printing.

22 Claims, 9 Drawing Sheets

PROCESS FOR DEVELOPING PHOTOGRAPHED FILM AND FOR PRINTING IMAGES THROUGH DEVELOPED FILM

BACKGROUND OF THE INVENTION

1. Field of the Invention;

The present invention relates to an improvement in continuous development of photographed films or microfilms. It relates also to an improvement in continuous development of photographed films or microfilms and successive printing of images through the developed films.

2. Prior Art Statement

When plural roll films or microfilms are continuously developed, it becomes necessary to control the density of developed images to a proper level. The density of developed images becomes too low as the developing liquid is fatigued or the film feed rate is too high. The density of developed images becomes too low when the concentration of developing reagent in the developing liquid is low, the liquid level in the developing liquid vessel is low or the temperature of the developing liquid is low. For the variation in these parameters in the developing step, it becomes difficult to control the density of the developed images to an appropriate density even if the film is exposed to a proper quantity of light at the photographing step by the use of an automatic exposure control device.

In order to control the developing operation so that the developed images have proper densities, it has been proposed to monitor the densities of the images simultaneously during the developing operation and to stop development when the density of developed image reaches a proper level. For example, Unexamined Japanese Patent Publication No. 181042/1983 (corresponding to Unexamined German Patent Publication DE-OS 3211946A) discloses a process for developemnt of an aperture card which has a microfilm strip mounted in an aperture grid of boards. The aperture card is maintained in the standstill condition and a developing liquid is sprayed onto the microfilm strip while the density of the developed images to monitored, and spraying of the developing liquid is stopped when the density of the developed images reaches a proper level, followed by immediate sparying of a fixing liquid to stop the developing operation. However, in this known process, the average density of the developed whole image is detected. Accordingly, some images have improper density levels depending on the contents of individual images.

When the densities of developed images in long films are controlled by varying the film feed rate, there arises a problem that the film feed rates at the subsequent fixing and rinsing steps are varied inevitably. Without changing the film feed rate, densities of developed images may be controlled by varying the concentration of developing reagent in the developing liquid. Otherwise, densities of developed images may be controlled by controlling the quantity of developing liquid contacting with the film or by varying the temperature of the developing liquid. However, high responsiveness is not expected in such a control system.

In reproduction of a microfilm or in printing of images of a film, it is required to control the condition of printing operation in response to the densities of developed images. In the conventional technology, the light quantity in the printing operation is determined by detecting the density of the developed image area. However, proper exposure light quantity cannot be monistically set, since the detected density is varied as the monitored image area is changed.

OBJECTS AND SUMMARY OF THE INVENTION

Accordingly, a first object of this invention is to provide a process for developing a film having one or more photographed image areas, whereby all of the photoraphed image areas are developed to have proper densities.

A second object of this invention is to provide a process for developing a film having one or more photographed image areas, whereby respective photographed image areas are continuously developed to have proper densities without being affected by the contents of the images.

A third object of this invention is to provide a process for developing a film having one or more photographed image areas so that developed image areas have proper densities and for printing the thus developed images through the film by exposing the film with proper quantity of light.

The first object of this invention is attained by the provision of a process for developing a film having one or more photographed image areas, comprising the steps of:

(a) exposing a region of said film other than said photographed image areas with a constant quantity of light;

(b) passing the region exposed with said constant quantity of light to a developing station preceding to said photographed image areas to develop said region exposed with said constant quantity of light;

(c) detecting the density of the developed image of said region exposed with said constant quantity of light, comparing the thus detected image density with a characteristic curve showing the change in density of the developed image in terms of the quantity of exposure light, and setting the condition for development to an optimum condition based on said characteristic curve; and (d) developing said photographed image areas under said optimum condition.

The second object of this invention is attained by the provision of a process for developing a film having one or more photographed image areas, comprising the steps of (a) exposing a region of said film other than said photographed image areas with a constant quantity of light;

(b) passing the region exposed with said constant quantity of light to a developing station preceding to said photographed image areas to develop said region exposed with said constant quantity of light by spraying a developing liquid;

(c) detecting the density of the developed image of said region exposed with said constant quantity of light, comparing the thus detected image density with a characteristic curve showing the change in density of the developed image in terms of the quantity of exposure light, and setting the condition for development to an optimum condition based on said characteristic curve; and (d) developing said photographed image areas by spraying said optimum quantity of said developing liquid onto said film.

The third object of this invention is attained by the provision of a process for developing a film having one or more photographed image areas, and for printing said photographed image areas of the developed film, comprising the steps of:

(a) exposing a fore end region and an aft end region out of said photographed image areas of said film with a constant quantity of light;

(b) passing one of said fore end region and said aft end region exposed with said constant quantity of light to a developing station preceding to said photographed image areas to develop said region exposed with said constant quantity of light;

(c) detecting the density of the developed image of said region exposed with said constant quantity of light, comparing the thus detected image density with a characteristic curve showing the change in density of the developed image in terms of the quantity of exposure light, and setting the condition for development to an optimum condition based on said characteristic curve;

(d) developing said photographed image areas and the other of said fore end region and said aft end region under said optimum condition; and (e) setting an optimum quantity of exposure light at a subsequent printing step based on the density of developed image of said other region exposed with said constant quantity of light.

The third object of this invention is also attained by the provision of a process for developing a film having one or more photographed image areas, and for printing said photographed image areas of the developed film, comprising the steps of:

(a) exposing a fore end region and an aft end region out of said photographed image areas of said film with a constant quantity of light;

(b) passing one of said fore end region and said aft end region exposed with said constant quantity of light to a developing station preceding to said photographed image areas to develop said region exposed with said constant quantity of light;

(c) detecting the density of the developed image of said region exposed with said constant quantity of light, comparing the thus detected image density with a characteristic curve showing the change in density of the developed image in terms of the quantity of exposure light, and setting the condition for development to an optimum condition based on said characteristic curve;

(d) developing said photographed image areas and the other of said fore end region and said aft end region under said optimum condition;

(e) setting an optimum printing condition at a subsequent printing step based on the density of developed image of said other region exposed with said constant quantity of light; and (f) printing said photographed image areas under said optimum printing condition.

According to further aspects of this invention, the process of this invention may be applied to develop a film having at least one region preliminarily exposed wih a constant quantity of light. The region exposed preliminarily with a constant quantity of light is positioned out of the areas where images are to be photographed and utilized for the determination of densities of developed images.

The first object of this invention is, therefore, attained by the provision of a process for developing a film having one or more photographed image areas and at least one region exposed with a constant quantity of light, comprising the steps of:

(a) passing said at least one region exposed with said constant quantity of light to a developing station preceding to said photographed image areas to develop said at least one region exposed with said constant quantity of light;

(b) detecting the density of the developed image of said at least one region exposed with said constant quantity of light, comparing the thus detected image density with a characteristic curve showing the change in density of the developed image in terms of the quantity of exposure light, and setting the condition for development to an optimum condition based on said characteristic curve; and (c) developing said photographed image areas under said optimum condition.

The second object of this invention is attained by the provision of a process for developing a film having one or more photographed image areas and at least one region exposed with a constant quantity of light, comprising the steps of:

(a) passing said at least one region exposed with said constant quantity of light to a developing station preceding to said photographed image areas to develop said region exposed with said constant quantity of light by spraying a developing liquid;

(b) detecting the density of the developed image of said region exposed with said constant quantity of light, comparing the thus detected image density with a characteristic curve showing the change in density of the developed image in terms of the quantity of exposure light, and setting the condition for development to an optimum condition based on said characteristic curve; and (c) developing said photographed image areas by spraying said optimum quantity of said developing liquid onto said film.

The third object of this invention is attained by the provision of a process for developing a film having one or more photographed image areas and fore and aft end regions which have been exposed with a constant quantity of light, and for printing said photographed image areas of the developed film, comprising the steps of:

(a) passing one of said fore end region and said aft end region exposed with said constant quantity of light to a developing station preceding to said photographed image areas to develop said region exposed with said constant quantity of light;

(b) detecting the density of the developed image of said region exposed with said constant quantity of light, comparing the thus detected image density with a characteristic curve showing the change in density of the developed image in terms of the quantity of exposure light, and setting the condition for development to an optimum condition based on said characteristic curve;

(c) developing said photographed image areas and the other of said fore end region and said aft end region under said optimum condition; and (d) setting an optimum quantity of exposure light at a subsequent printing step based on the density of developed image of said other region exposed with said constant quantity of light.

The third object of this invention is also attained by the provision of a process for developing a film having one or more photographed image areas and fore and aft end regions which have been exposed with a constant quantity of light, and for printing said photographed image areas through the developed film, comprising the steps of:

(a) passing one of said fore end region and said aft end region exposed with said constant quantity of light to a developing station preceding to said photographed image areas to develop said region exposed with said constant quantity of light;

(b) detecting the density of the developed image of said region exposed with said constant quantity of light, comparing the thus detected image density with a characteristic curve showing the change in density of the developed image in terms of the quantity of exposure light, and setting the condition for development to an optimum condition based on said characteristic curve;

(c) developing said photographed image areas and the other of said fore end region and said aft end region under said optimum condition;

(d) setting an optimum printing condition at a subsequent printing step based on the density of developed image of said other region exposed with said constant quantity of light; and (e) printing said photographed image areas under said optimum printing condition.

DESCRIPTION OF DRAWINGS

The above and other objects of this invention will be more easily understood from the following detailed description of the invention while referring to the appended drawings in which.

DETAILED DESCRIPTION OF THE INVENTION

Prior to describing preferred embodiments of this invention, the principle of the invention will be described.

Figure 7:
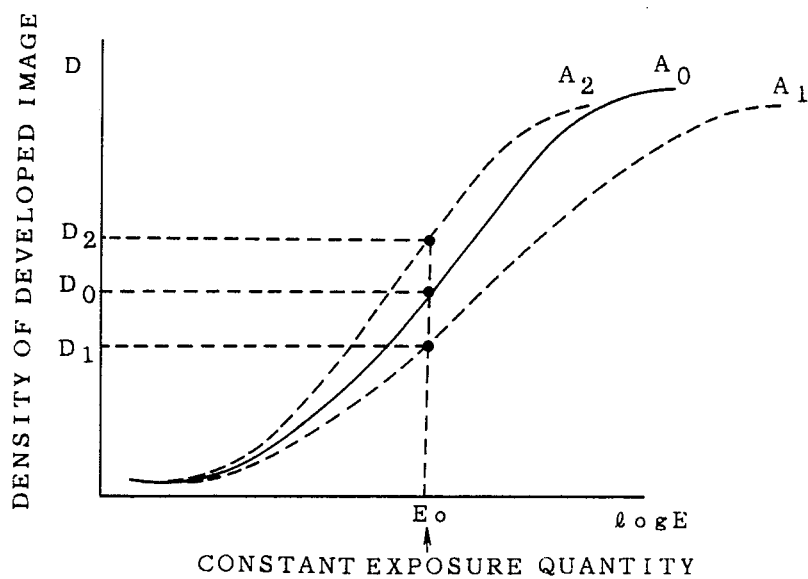
FIG. 7 is a graph showing characteristic curves which show densities of developed images in terms of the quantity of light exposed to the film, the images being developed according to the first and second embodiments of the invention.
Figure 8:
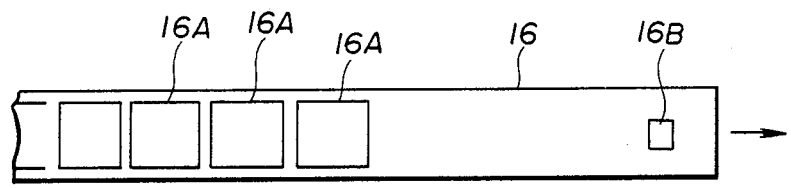
FIG. 8 is a plan view showing a portion of a developed film.

FIG. 7 is a graph showing the characteristic curves which show the densities D of developed images in terms of quantity of light E exposed to the film. The abscissa of FIG. 7 is indented in logarithmic scale. Referring to FIG. 7, the characteristic curve $A_0$ is a curve which shows the change in density D of a developed image which has been developed under an optimum condition. As shown in FIG. 8, a film 16 has an exposed region 16B which is exposed with a constant quantity of light and positioned in front of the photographed image areas 16A. When the film 16 is conveyed at an optimum feed rate $V_0$, the region 16B is developed properly to have an appropriate density $D_0$. However, when the film 16 is conveyed at an excessively high feed rate $V_1$, the interrelation between the quantity of light exposed to the film and the density of developed image is denoted by a characteristic curve $A_1$ in FIG. 7 so that the density of the region 16B exposed with a constant exposure quantity $E_0$ of light is changed to $D_1$. On the contrary, when the film is conveyed at a lower feed rate $V_2$, the interrelation between the quantity of light exposed to the film and the density of developed image is denoted by a characteristic curve $A_2$ in FIG. 7 so that the density of the region 16B exposed with a constant exposure quantity $E_0$ of light is changed to $D_2$ Accordingly, by measuring the density of the developed image in the region 16B exposed with a constant quantity of light and comparing the thus measured density with the appropriate density $D_0$, the film feed rate for realization of appropriate density $D_0$ can be determined. For instance, if the density of the developed image in the region 16B is $D_1$, the film feed rate V should be varied by $\Delta V = V_0 - V_1$ which can be obtained with reference to FIG. 7. In the description given above, the film feed rate V has been varied as one of variable parameters in the developing operation, the condition for development could be controlled by varying the concentration of the developing reagent in the developing liquid, the quantity of the developing liquid supplied or the temperature of the developing liquid.

According to this invention, the characteristic curves showing the interrelations between the density of developed image and the quantity of light to which the film is exposed under variable conditions for development are stored in a memory, and the detected density of a developed image is compared with the thus stored characteristic curves to find an optimum condition for development.

A principle of the operation for controlling the quantity of developing liquid sprayed onto the film will now be described.

Figure 9:
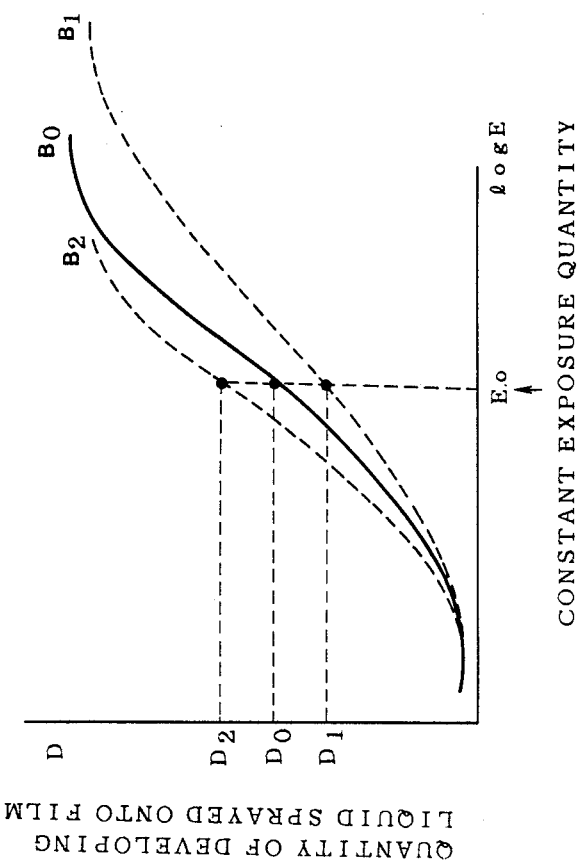
FIG. 9 is a graph showing characteristic curves which show densities of developed images in terms of the quantity of light exposed to the film, the images being developed in accordance with the third and fourth embodiments of this invention while changing the quantity of developing liquid the film.

FIG. 9 is a graph showing characteristic curves which show densities of developed images in terms of the quantity of developing liquid sprayed onto the film, the images being developed in accordance with the third and fourth embodiments of this invention. In FIG. 9, the characteristic curves $B_2$, $B_0$ and $B_1$ show, respectively, the change in density of developed images on a certain film in terms of the quantity of light exposed to the film, the images being developed by setting the quantity of developing liquid sprayed onto the film to $X_2$ for the curve $B_2$, $X_0$ for the curve $B_0$ and $X_1$ for the curve $B_1$. The abscissa of FIG. 9 is indicated in logarithmic scale, and $X_2$ is larger than $X_0$ which is larger than $X_1$. The film 16 is provided with a region 16B exposed to a constant quantity of light $E_0$ and positioned in front of the areas 16A in which photographed images are to be born (see FIG. 8). The the density $D_0$ of the developed image in the region 16B is the appropriate density, and the characteristic curve $B_0$ shows the optimum condition for development. Assuming now that the developed image in the region 16B exposed with the constant quanity of light has a density $D_1$ when the quantity of sprayed developing liquid is $X_1$, the change in sprayed quantity X for adjusting the density $D_1$ to the optimum density $D_0$ ($\Delta X = X_0 - X_1$) can be determined with reference to FIG. 9. According to this invention, the characteristic curves as shown in FIG. 9 are stored in a memory so that the quantity of developing liquid to be sprayed onto the film is adjusted to an optimum quantity by calculating the proper variation $\Delta X$ in sprayed quantity from the detected density D.

The principle for the determination of the condition for printing, namely for the determination of the quantity of light in the printing operation, will now be described.

Figure 10:
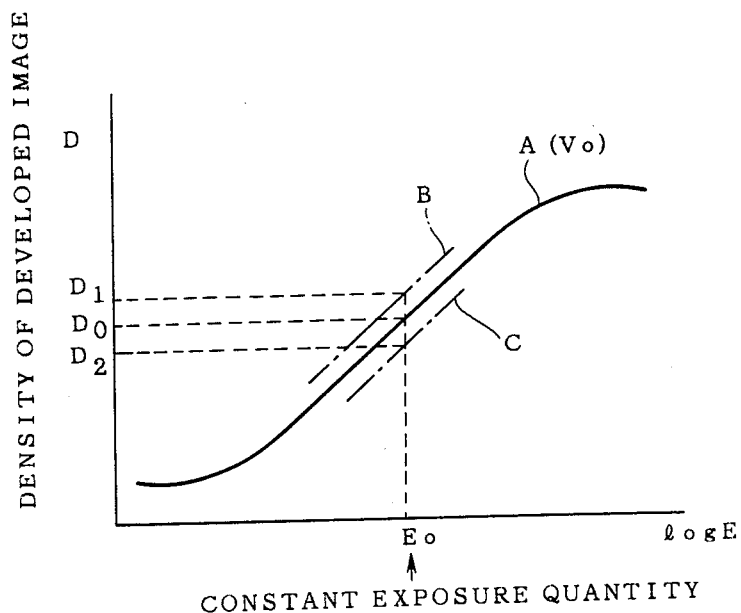
FIG. 10 a graph showing characteristic curves which show densities of developed images in terms of the quantity of light exposed to the film, the images being developed in accordance with the fifth embodiment of this invention.
Figure 11:
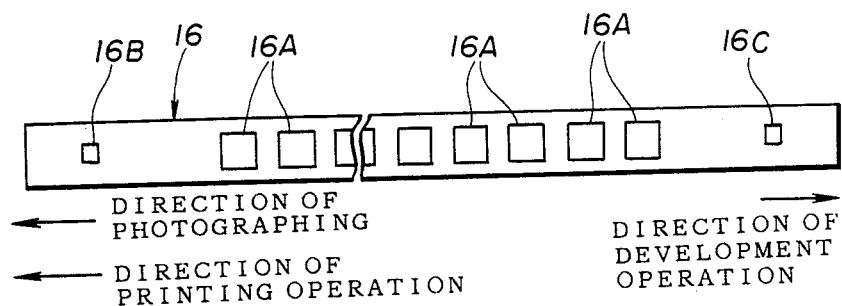
FIG. 11 is a plan view showing a portion of a film which is to be and then used for printing of images according to the process of this invention.

FIG. 10 is a graph showing characteristic curves which show densities of developed images in terms of the quantity of light exposed to the film, the images being developed in accordance with the fifth embodiment of this invention; and FIG. 11 is a plan view showing a portion of a film which is to be developed and then used for printing of images according to the process of this invention. The characteristic curve A in FIG. 10 shows the optimum change in density of developed images when the quantity of light E exposed to a certain film is varied. At the fore and aft ends of the film spaced by proper distances from the area (photographed image area) 16A, provided are regions 16B and 16C each exposed to a constant quantity of light, as shown in FIG. 11.

The region 16C exposed with the constant quantity of light is developed initially at the developing step, and the density D of the developed image in the region 16C is varied as the film feed rate is changed. When the film feed rate V is set to a rate $V_1$ which is lower than the optimum rate $V_0$, the density of the developed images becomes denser as shown by the characteristic curve B in FIG. 10. On the contrary, when the film rate is set to a rate $V_2$ which is higher than the optimum rate $V_0$, the density of the developed images is reduced. By setting the film feed rate V to $V_0$, $V_1$ and $V_2$, the density of the developed image in the region 16C is varied to have the density $D_0$, $D_1$ or $D_2$. When the density D at a certain film feed rate $V_x$ is detected, by obtaining the change in film feed rate $\Delta V$ to adjust the density of developed image to the optimum density $D_0$ According to this invention, the optimum condition for development, for example the film feed rate, is determined, followed by development of the photographed image area 16A and the region 16B, which is exposed to the constant quantity of light and positioned at the aft end of the film, under the thus determined condition.

When the condition for development is controlled as aforementioned, the developed image in the region 16B at the aft end of the film has the optimum density $D_0$. According to this invention, the region 16B is utilized to determine an optimum condition for the subsequent printing operation for reproducing or printing the images on the film 16.

DESCRIPTION OF PREFERRED EMBODIMENTS

First Embodiment

Preferred embodiments of this invention will now be described with reference to FIGS. 1 to 6. Initially referring to FIG. 1 showing a camera processor used for practical operation of the process of the invention, a camera used for photographing images in a microfilm is combined with a processor for automatically and continuously processing the film to form a unit.

Figure 1:
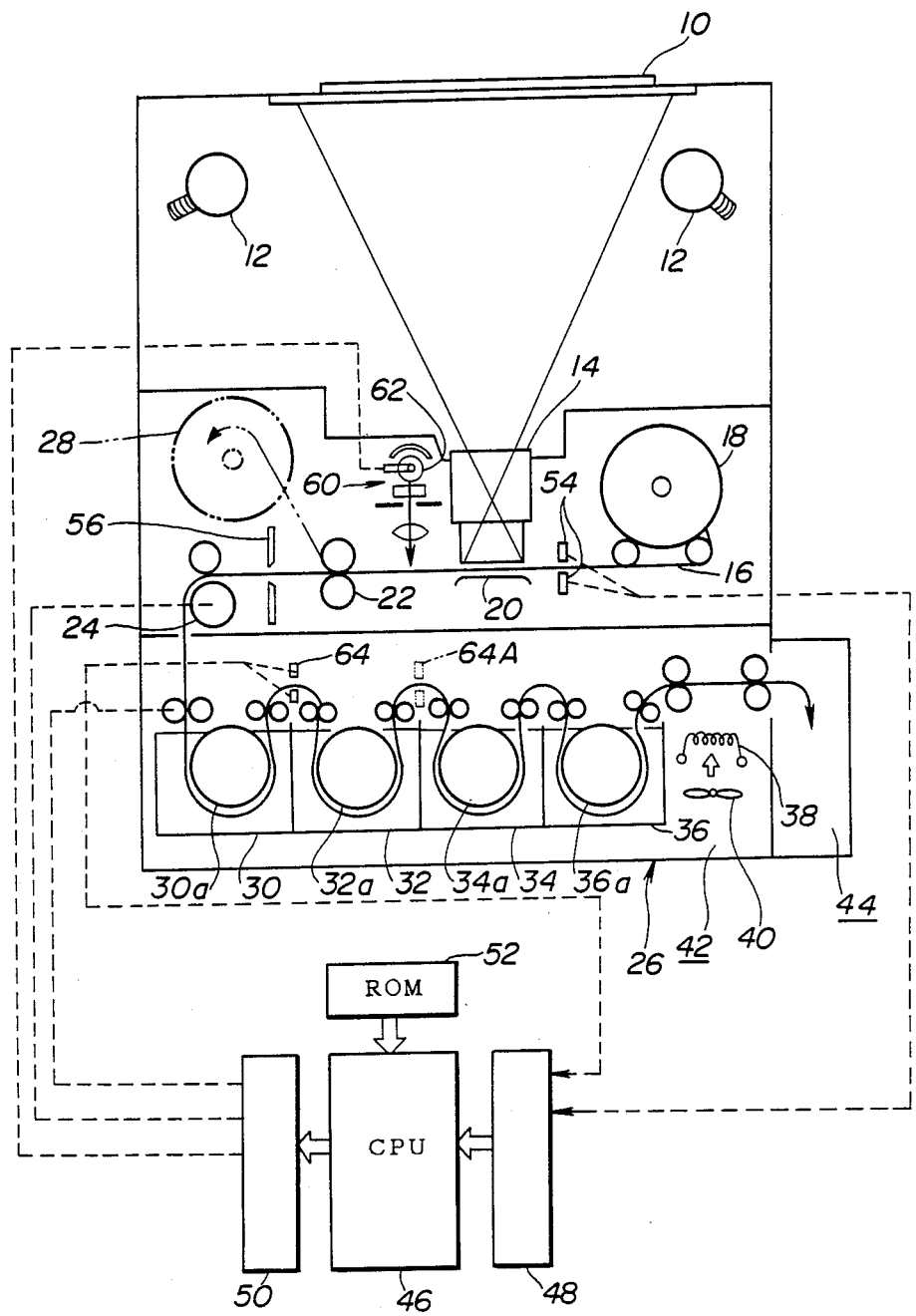
FIG. 1 is a schematic illustration showing the general construction of a camera processor which is used for practical operation of the process according to the first embodiment of this FIG. 2 illustration showing the general of a camera processor which is used for practical operation of the process according to the second embodiment of this the developing condition other feed rate is controlled to control the dens developed image.

In FIG. 1, reference numeral 10 designates a document which bears images to be photographed, reference numerals 12, 12 designate lamps for illuminating the document 10, reference numeral 14 designates a lens, and reference numeral 16 designates a roll film. The roll film 16 is supplied from a reel 18, and held in position by a film press plate 20 and exposed to light. The exposed roll film 16 is passed through drive rollers 22 and turn rollers 24 to a film processor 26 where it is subjected to automatic development. The film 16 may be once taken up by a take-up reel 28 and then delivered to the developer device 26, as desired.

The film processor 26 comprises a developing station 30, a fixing station 32, a first rinsing station 34 and a second rinsing station 36, and the film 16 is guided by racks 30a to 36a in respective stations 30 to 36 to be immersed in the treating liquids in these stations. After the completion of development, fixing and rinsing with water, the film 16 is dried in a drying chamber 42 provided with a heater 38 and a fan 40 and then contained in a film tray 44.

The control system for the processor comprises a central processing unit (CPU) 46, an input interface 48, an output interface 50 and a read-only memory (ROM) 52. The characteristic curves shown in FIG. 7 are stored in the ROM 52 in addition to the operation program for the CPU 46.

An optical sensor 54 detects the fore or aft end of the film 16 and generates an output signal which is fed to the CPU 46. Reference numeral 56 is a cutter for cutting the film 16, as desired.

An assembly 60 for exposing the film 16 with a constant quantity of light $E_0$ is provided. This assembly 60 comprises a lens, a plate having a slit, a dispersing plate, a lamp 62 and a reflector plate arranged in this order from the position close to the film 16. The lamp 62 is controlled by the CPU 46 so that it is energized when the film 16 is held at a certain position. When the film 16 is directly passed to the film processor 26, rather than being taken up by the take-up reel 28, the CPU 46 instructs to energize the lamp 62 to expose the film with a constant quantity of light $E_0$ when the region 16B is positioned beneath the assembly 60, the region 16B being positioned in front of the image photographed area 16A and spaced from the image photographed area 16A by a pre-set distance. By sensing the fore end of the film 16, the region 16B is determined in consideration of the film feed rate. Thus, the film 16 is provided with the region 16B exposed to the constant quantity of light, as shown in FIG. 8.

A density sensor 64 is provided at a position intermediate from the developing station 30 to the fixing station 32 to sense the density D of the developed image in the region 16B exposed to the constant quantity of light. Since the film 16 is still sensitive to light, the sensor 64 should be an infrared ray sensor or other type sensors utilizing light having wavelengths which are not sensed by the film 16. The output from the sensor 64 is fed to the CPU 46 which calculates the difference between the detected density $D_1$ or $D_2$ and the optimum density $D_0$ by referring to the information concerning the characteristic curves $A_0$, $A_1$ and $A_2$ stored in the ROM 52 and then determines the variation in condition for development to be adjusted to the optimum density $D_0$. For instance, when the film feed rate V is controlled to adjust the condition for development to the optimum condition, a variation in film feed rate $\Delta V = V_0 - V_1$ or $\Delta V = V_0 - V_2$ is determined as seen from FIG. 7. The CPU 46 controls the film feed rate so that the rate is changed to $V + \Delta V$ by adding $\Delta V$ to the film feed rate V. The film 16 is then fed at the adjusted film feed rate $V + \Delta V$ so that the image photographed areas 16A are developed to have appropriate densities.

The film 16 has been directly delivered to the film processor 26, rather than being taken up by the take-up reel 28, and the region 16B exposed with the constant quantity of light is positioned in front of the image photographed areas 16A in the embodiment described above. However, when the film 16 is once taken up by the take-up rel 28 and then subjected to development, the film feeding direction at the developing step is reversed. In such a case, the region 16B exposed to the constant quantity of light should be positioned at an aft end of the film 16.

The density sensor 64 may be placed at the position shown by dots-and-dash line in FIG. 1, namely a position behind the fixing station 32 to detect the density of the developed and fixed image in the region 16B exposed to the constant quantity of light. When the density sensor 64 is placed at a position behind the fixing station, the light ray utilized for the operation of the sensor 64 is not limited since the film 16 has become insensitive to light rays of the whole wavelength region by fixing.

The film feed rate has been varied for controlling the condition for development in the aforementioned embodiment so that the feed-back speed of the density control system is high to ensure precise control of the densities of the images in the photographed image areas. However, the parameter varied to control the condition for development is not limited only to the film feed rate. Within the scope of this invention, the condition for development may be controlled by varying the other parameters in the developing step. For example, the concentration of the developing reagent in the developing liquid, the quantity of the developing liquid or the temperature of the developing liquid may be varied to control the condition for development. Rather than varying a single parameter, plural parameters in the developing step may be varied to control the condition for development so that the photographed imges are developed to have appropriate densities.

Second Embodiment

Figure 2:
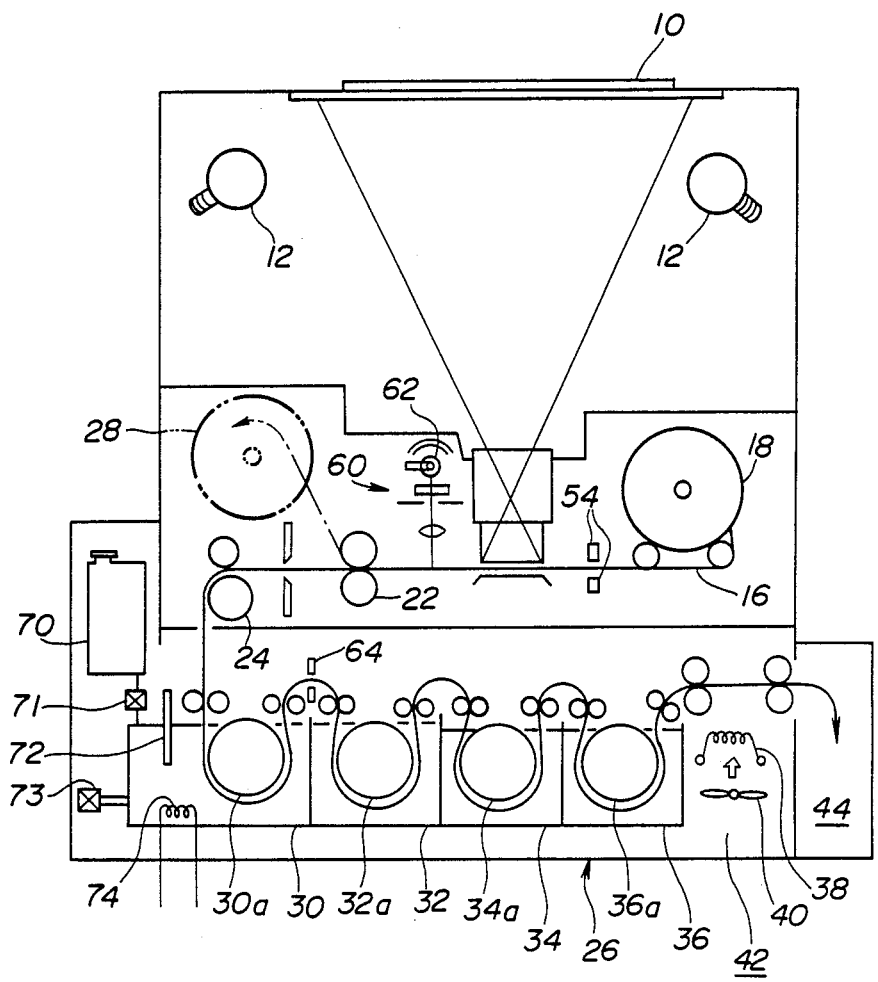

FIG. 2 shows a general construction of a camera processor which is used for practical operation of the process according to the second embodiment of this invention wherein one or more parameters, other than the film feed rate, in the developing step are controlled. Since characteristic curves similar to those shown in FIG. 7 can be plotted when parameters other than the film feed rate are varied, information relating to such characteristic curves is stored in the ROM 52. The condition for development may be controlled by varying the feed rate of fresh developing liquid from a tank 70 through a valve 71. The condition for development may also be controlled by detecting the height of the liquid surface of the developing liquid by a surface height sensor 72 and then the height of liquid surface is controlled by a valve 73. Otherwise, the temperature of the developing liquid may be varied by the use of a heater 74 to control the condition for development. When the density of the developed image in the region 16B exposed to a constant quantity of light is low, the feed rate of the developing liquid is increased, the liquid surface of the developing liquid is raised or the temperature of the developing liquid is raised. When the density of the developed image in the region 16B exposed to a constant quantity of light is too high, the selected parameter in the developing step is varied in the reverse direction.

In FIG. 2, same or similar parts as in FIG. 1 are denoted by the same reference numerals. The device shown in FIG. 2 is combined with the same control system as shown in FIG. 1 and including CPU 46, ROM 52 and other components. The same or similar parts and the control system will not be explained for the simplicity of the description.

In the first and second embodiments described hereinbefore, the present invention is practically operated while using a camera-processor unit in which a camera for photographing images of the document 10 on a microfilm 16 is combined with the film processor 26. However, it is not intended to limit the invention only to such embodiments. The present invention may be applied for continuous development of a 16 mm or 32 mm roll film charged in an ordinary camera, and for continuous development of a reproduced microfilm in a duplicator. The present invention may also be applied for continuous development of plural cut films, such as microfishe films. The process of this invention may be effected by the use of a variety of film processors.

The density sensor 64 may comprise a light emitting element facing to one side of the film 16 and a light sensor facing to the other side of the film 16 to sense the light transmitting through the film 16. However, it is preferred that a light emitting element and a light sensor are placed in the same side of the film 16 so that the light reflected by the film surface is sensed by the sensor to avoid influence of the liquid adhering to the film surface when there is a possibility that the film cannot be squeezed to remove the developing liquid sufficiently.

Third Embodiment

Figure 3:
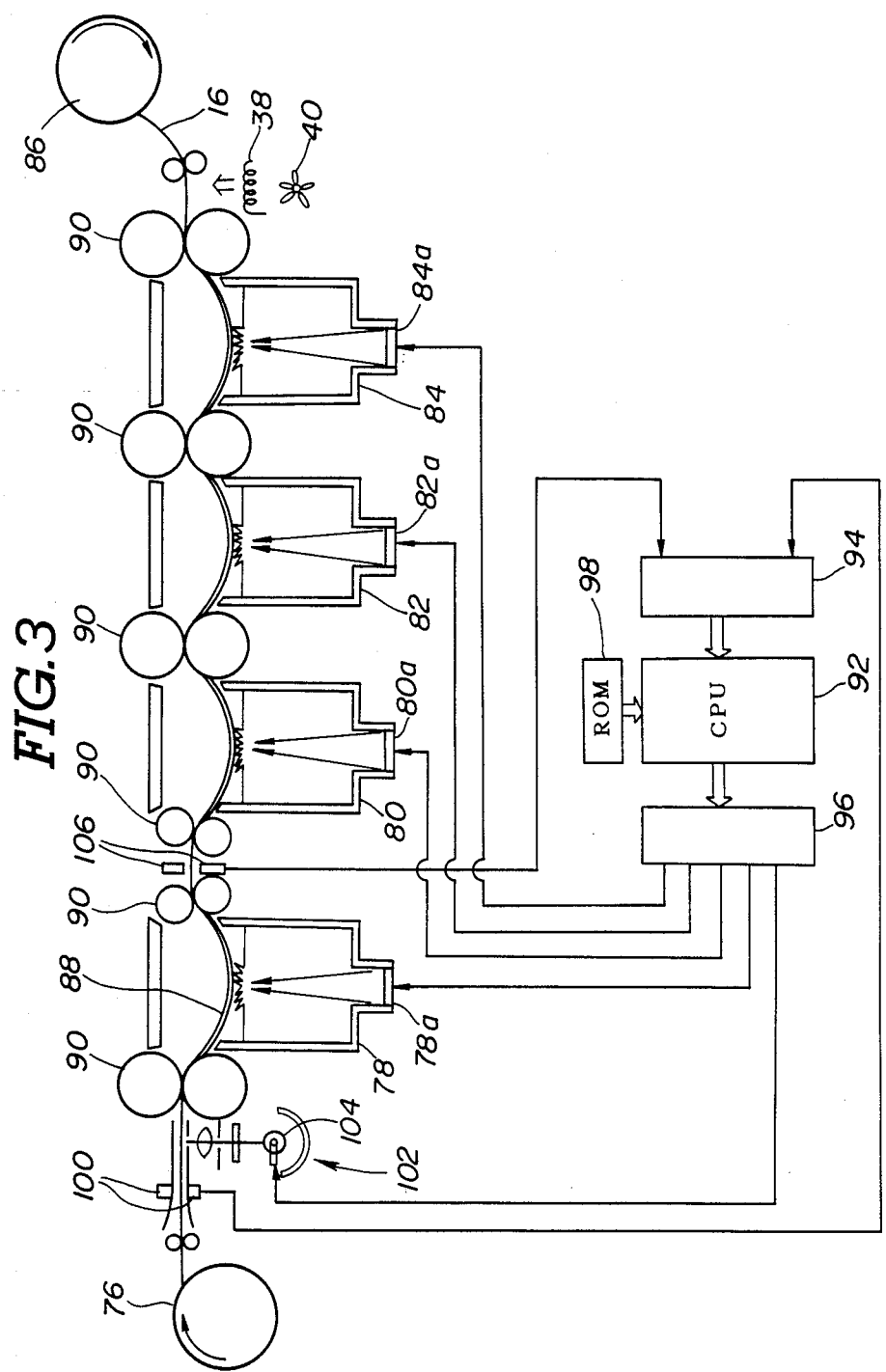
FIG. 3 is a schematic illustration showing the general construction of a continuous film processor which is used for practical operation of the process according to the third embodiment of this invention wherein the quantity of sprayed developing liquid is controlled to control the density of developed images.

FIG. 3 is a schematic illustration showing the general construction of a continuous film processor which is used for practical operation of the process according to a third embodiment of this invention. In FIG. 3, a film 16 is supplied from a supply reel 76, and passed trough a developing liquid vessel 78, fixing liquid vessel 80, a first rinsing liquid vessel 82 and a second rinsing liquid vessel 84 to be taken up by a take-up reel 86. The vessel 78 contains a developing liquid, the vessel 80 contains a fixing liquid, and the vessels 82 and 84 contain rinsing liquids, the liquid surfaces of the liquids in respective vessels being held at predetermined levels. The film 16 is guided by a number of guide rollers 90. Each of the vessels 78 to 84 has a top opening over which an arcuated guide member 88 is provided so that the film 16 is guided along the guide member 88 to move close to the liquid surface at the substantial center of the top opening of each of the vessels 78 to 84.

An ultrasonic wave generating vibrators 78a to 84a are provided on the bottoms of respective vessels 78 to 84, and ultrasonic vibrations are applied to the liquids in the vessels to be focused at the liquid surfaces upon energization of actuating circuits (not shown). The liquids in the vessels 78 to 84 are spouted from the focal points to form fine mists. As the film 16 moves over the top openings of these vessels 78 to 84, the spouting mists of the liquids adhere to the downside of the film 16 to effect development, fixing and rinsing. Each of the ultrasonic wave generating vibrators may be made of a quarz vibrator, or a vibrator utilizing piezoelectric phenomenon of lead zirconate titanate (PZT) which is one of ceramics, polyvinylidene fluoride (PVDF) which is one of plastics or a composite material of ceramics (PECM). The quantity of spouting mists from the surface of each liquid may be varied by controlling the electric potential or frequency of the electric current for actuating each vibrator 78a to 84a.

After the completion of development, fixing and rinsing, the film 16 is dried by means of a heater 38 and a fan 40 to be taken up by a take-up reel 86.

The control system combined with the film processor comprises a CPU 92, an input interface 94, an output interface 96 and a ROM 98 in which information concerning the characteristic curves showing the interrelation between the densities of the developed images and the quantity of the developing liquid supplied to the film is stored in addition to the operation program of the CPU 92.

An optical sensor 100 for detecting the fore end of the film 16 is provided, and the output signal from the sensor 100 is fed to the CPU 92.

An assembly 102 for exposing the film 16 with a constant quantity of light $E_0$ is assembled in the film processor and has a construction similar to the assembly 60 shown in FIG. 1. The lamp 104 of the assembly 102 is controlled by the CPU 92 so that it emits a constant quantity of light when the film 16 is held at a predetermined position. In detail, the CPU 92 instructs to energize the lamp 104 to expose the film 16 with a constant quantity of light $E_0$ when the region 16B is positioned beneath the assembly 102, the region 16B being positioned in front of the image photographed area 16A and spaced from the image photographed area 16B by a pre-set distance. By sensing the fore end of the film 16, the region 16B is determined in consideration of the film feed rate. Thus, the film 16 is provided with the region 16B exposed to the constant quantity of light, as shown in FIG. 8.

A density sensor 106 is provided at a position between the developing liquid vessel 78 and the fixing liquid vessel 80 to sense the density D of the developed image in the region 16B exposed to the constant quantity of light. Since the film 16 is still sensitive to light, the sensor 106 should be an infrared ray sensor or other type sensor utilizing light having wavelengths which are not sensed by the film 16.

For instance, the sensor 106 detects that the developed image in the region 16B exposed to the constant quantity of light has a density of $D_1$ when the film 16 is sprayed with the spouting developing liquid at a spray rate of x. The output from the sensor 106 is fed to the CPU 92 which calculates the difference between the detected density D, for example $D_1$ or $D_2$, and the optimum density $D_0$ by referring to the information concerning the characteristic curves shown in FIG. 9 stored in the ROM 98 and then determines the variation in spray rate $\Delta x = x_0 - x_1$. In order to agree the detected density $D_1$ with the optimum density $D_0$, the vibrtor 78a in the developing liquid vessel 78 is controlled so that the spray rate x is varied by $\Delta x$. The photographed image areas 16A are then subjected to developing operation while maintaining the spray rate $x + x_0 - x_1$, whereby the image photographed areas 16A are developed to have appropriate densities.

Likewise, the sensor 106 detects that the developed image in the region 16B exposed to the constant quantity of light has a density of $D_2$ when the film 16 is sprayed with the spouting developing liquid at a spray rate of x. In such a case, the variation in spray rate x takes a of $x_0 - x_2$ so that the spray rate is adjusted to $x + x_0 - x_2$.

Similarly as in the first embodiment, the density sensor 106 may be placed at a position behind the fixing liquid vessel 80, so that the density of the developed and fixed image in the region 16B exposed with the constant quantity of light is detected.

Fourth Embodiment

Figure 4:
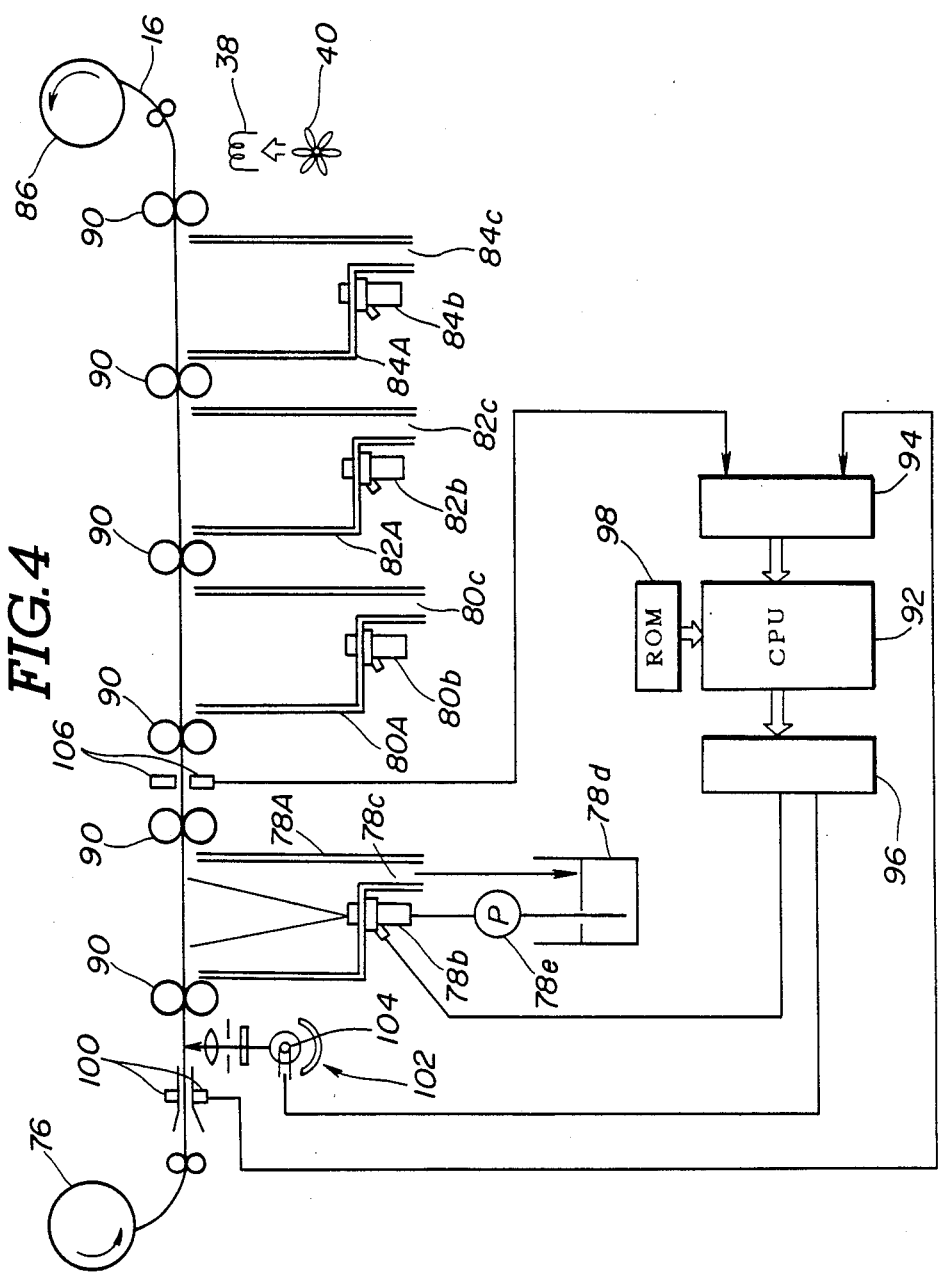
FIG. 4 schematic illustration showing the general construction of another continuous film processor which is used for practical operation of the process according to the fourth embodiment of this invention wherein the quantity of sprayed developing liquid is controlled to control the dens developed images.

FIG. 4 is a schematic illustration showing the general construction of another continuous developer device which is used for practical operation of the process according to a fourth embodiment of this invention wherein the quantity of sprayed developing liquid is controlled to control the density of developed images. In this fourth embodiment, developing liquid and other treating liquids are sprayed onto the downside of the film 16 using spray nozzles 78b to 84b. The spray nozzles 78b to 84b are mounted on the bottoms of respective treating liquid vessels 78A to 84A so that a developing liquid, a fixing liquid and rinsing liquids are sprayed onto the downside of the film 16. Liquid discharge ports 78c to 84c are provided through the bottoms of the vessels 78A to 84A. For the understanding of the fourth embodiment, the operation of the developing station will be described. The developing liquid is dishcarged from the developing liquid vessel 78A through the discharge port 78c to a tank 78d. The developing liquid in the tank 78d is fed to the spray nozzle 78b by a pump 78e under a pressed condition to be sprayed from the spray nozzle 78b. The spray nozzle 78b is electromagnetic type and controlled in response to the signal from the CPU 92 so that the quantity of sprayed developing liquid is adjusted.

According to the fourth embodiment, the density D of the developed image in the region 16B exposed to the constant quantity of light is detected by the density sensor 106, and the variation in sprayed quantity $\Delta x$ is calculated by the CPU 92 to adjust the sprayed quantity to an optimum sprayed quantity $(x+\Delta x)$.

The third and fourth embodiments may also be used in a duplicator for reproducing a roll film or a microfilm to control the developing operation taking place in the duplicator. These embodiments may be applied for continuous development of plural cut films, such as microfiche films. It is intended to emcompass all these possible applications within the scope of this invention.

Fifth Embodiment

Figure 5:
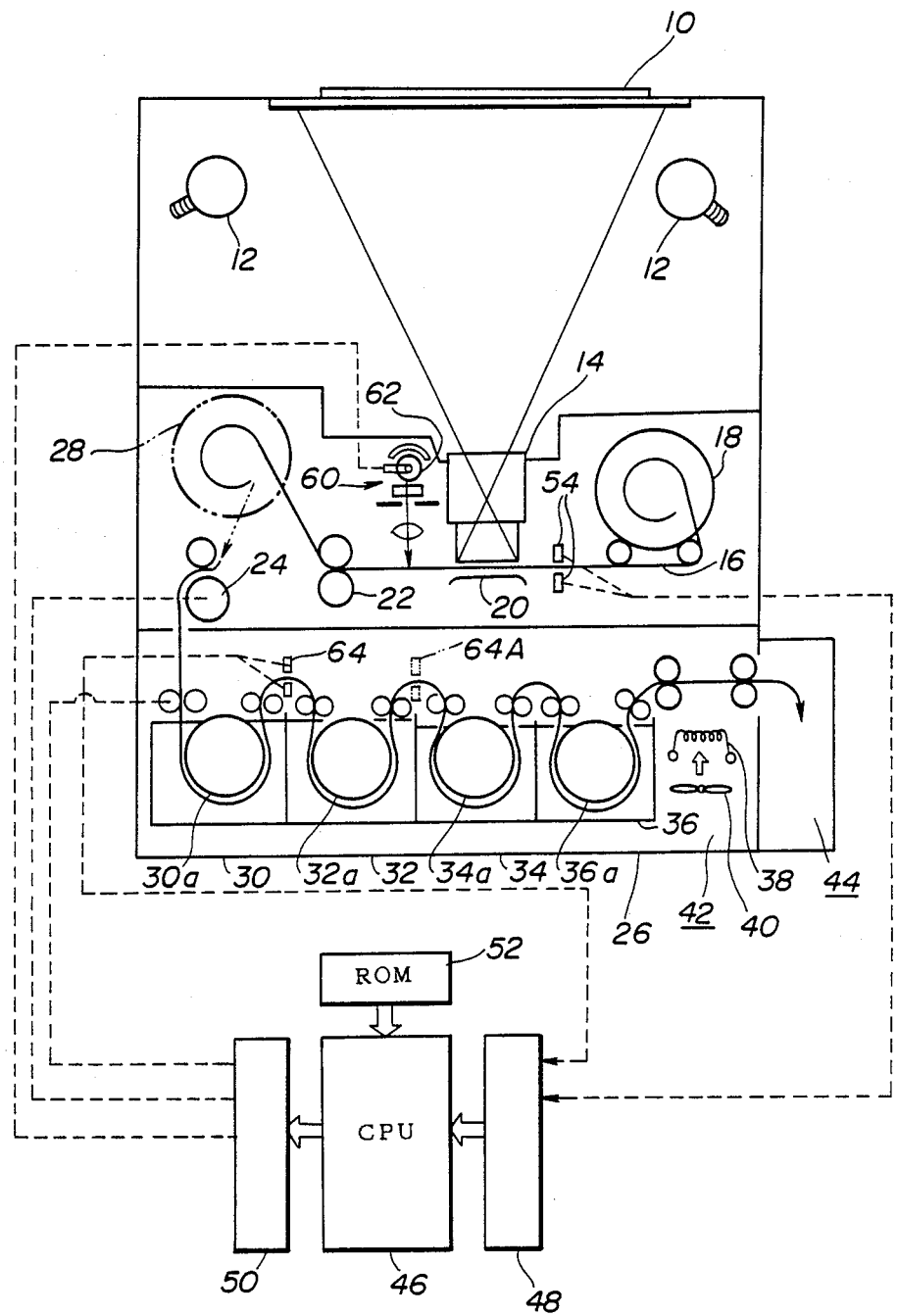
FIG. 5 schematic illustration showing the general construction of a camera processor which is used for practical operation of the process for developing and subsequent printing of photographed images, according to the fifth embodiment of this invention.
Figure 6:
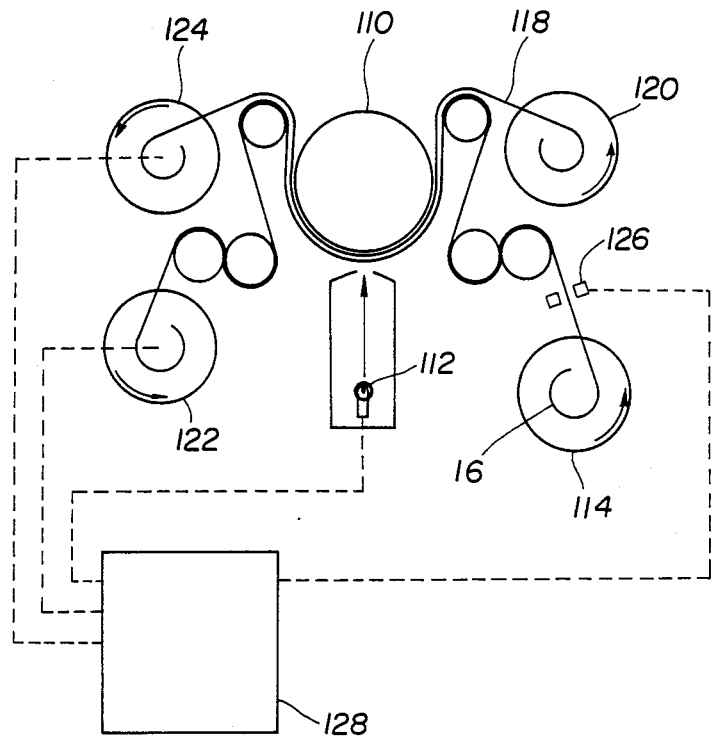
FIG. 6 is a schematic illustration showing the general construction of a duplicator assembled with the camera processor of FIG. 5.

FIG. 5 is a schematic illustration showing the general construction of a camera processor which is used for practical operation of the process for developing and subsequent printing of photographed images, according to a fifth embodiment of this invention; and FIG. 6 is a schematic illustration showing the general construction of a duplicator assembled with the camera processor of FIG. 5.

The camera processor shown in FIG. 5 comprises a camera for photographing images of a document on a microfilm, and a processor for developing the photographed microfilm automatically and continuously. The construction of the camera processor shown in FIG. 5 is generally similar to that of the processor shown in FIG. 1, and the same parts are denoted by the same reference numerals. For the simplicity of description, the construction and operation of the same parts will not be repeated herein.

The fifth embodiment is differentiated from the first embodiment in that each of two regions 16B and 16C, one positioned in front of the image photographed areas 16A and the other positioned behind the image photographed areas 16A, is exposed with a constant quantity of light and then the film 16 is once taken up by a take-up reel 28. The film 16 once taken up by the take-up reel 28 is fed to a film processor 26.

An optical sensor 54 senses the fore and aft ends of the film 16 to generate signals which are fed to a CPU 46. The CPU determines the regions 16B and 16C from the data concerning the fore and aft ends of the film 16 and the data concerning the film feed rate, and instructs a lamp 62 to emit a constant quantity of light when each of the regions 16B and 16C is held beneath an assembly 60 for emitting a constant quantity of light so that each of the regions 16B and 16C is exposed with the constant quantity of light. Thus the film 16 is provided with regions 16B and 16C each exposed to the constant quantity of light and each spaced from the photographed image areas 16A by a certain distance, as shown in FIG. 11.

The film once taken up by the take-up reel 28 is then passed to the developer device 26, with the region 16C being developed initially.

The sensor 64 detects the density D of the developed image in the region 16C to generate a signal which is fed to the CPU 46. The CPU 46 compares the input signal with the information concerning the characteristic curves shown in FIG. 10 and stored in the ROM 52. Based on the result of comparison, the CPU 46 calculates the variation of a certain parameter for development necessary for allowing the detected density D to agree with the optimum density $D_0$ For example, when the film feed rate is selected as the parameter for controlling the condition for development, the CPU 46 adjusts the film feed rate V to the optimum rate so that the developed image in the region exposed to the constant quantity of light has the optimum density $D_0$. If the developed image in the region 16C has a density $D_1$ when the film 16 is moved at a film feed rate of $V_x$, the variation in film feed rate to be increased is calculated from the equation of $\Delta V = V_0 + V_1$. Accordingly, the optimum film feed rate is calculated to be $V_x + V_0 - V_1$. The film 16 is then moved at the film feed rate of $V_x + V_0 - V_1$ to develop the photographed image areas 16A and the region 16B exposed to the constant quantity of light, whereby the images in the areas 16A and the region 16B have appropriate densities.

The developed film 16 which has been developed under the optimum condition is reproduced by the duplicator shown in FIG. 6. In FIG. 6, reference numeral 110 designates a movably carried drum, and reference numeral 112 designates a lamp serving as a light source. The developed film 16 is fed from a reel 114, and an undeveloped green film 118 is fed from a reel 120. The films 118 and 16 are fed to the drum 110 under the condition that the film 118 moves along the peripheral surface of the drum 110 while being overlaid with the film 16. By exposing the film 118 with a light emitted from the lamp 112 through the film 16, images on the film 16 are reproduced on the film 118. Then, the film 118 is taken up by the take-up reel 124, and the film 16 is taken up by the take-up reel 122.

The film 16 is fed from the reel 114 with the left end thereof as shown in FIG. 11 being the leading end. In other words, the region 16B exposed to the constant quantity of light is positioned in front of the photographed image areas 16A. The density of the image in the region 16B is detected by the density sensor 126. The density of the image in the region 16B detected by the density sensor 126 is fed to a control device which is generally denoted by 128 and includes a CPU and other components. The control device 128 controls one or more parameters, such as the quantity of light emitted from the lamp 112 or the rotational speed of the take-up reels 122 and 124, so that the film 118 is exposed with an optimum quantity of light.

Since the film 16 is once taken up by the take-up reel 28 and then fed from the reel 28 to the developer device 26 in the fifth embodiment, the region 16C positioned behind the photographed image areas 16A at the photographing step is fed initially to the developing station 26. However, when the film is directly fed from the camera to the developer device 26, the film 16 is fed in the reverse direction and thus the region 16B exposed to the constant quantity of light is fed initially to the developing station.

The description set forth above describes the fifth embodiment which has been used in a camera processor for recording the images of the document 10 on a microfilm while using a unit including a camera and a film processor 26, and which has also been used in a duplicator. However, the use of the fifth embodiment is not limited only to the applications as described above, but may be applied for development and printing of 16 mm or 32 mm roll films photographed in ordinary cameras. When the fifth embodiment is applied for development and printing of commonly used roll films, an assembly 60 is provided in either one of the film processor or the camera for exposing regions 16B and 16C in the fore and aft end portions of the film 16 with a constant quantity of light. The fifth embodiment may also be applied for continuous development and printing of plural cut films, such as microfiche films. In the illustrated example, the fifth embodiment is used in a duplicator for reproducing a microfilm. However, the fifth embodiment of this invention may also be used in a microfilm reader printer or in an apparatus for reproducing an positive image on printing paper. It is, therefore, intended to embrace all such alternations within the scope of this invention.

The present invention may be applied while using a film having regions preliminarily exposed to a constant quantity of light at the fore and end portions of the film. In such a case, the assembly 60 or 102 for exposing the regions (16B and 16C) with a constant quantity of light may be excluded.

As will be seen from the foregoing description, the present invention provides a process comprising the steps of exposing a region in front of the photographed image areas with a constant quantity of light, developing the region exposed with the constant quantity of light and detecting the density of the thus developed image in the said region, comparing the thus detected image density with a characteristic curve showing the change in density of exposure light so that the condition for development is controlled before the photographed image areas are developed. Since the density of the developed image in the region exposed to the constant quantity of light is determined monistically irrespective of the densities of individual images in the photographed image areas, the photographed image areas can be developed under an optimum condition to have stable image densities. Since the condition for development is stably maintained at the optimum condition, the densities of the developed images are maintained at appropriate levels without being affected by fluctuations of parameters during the developing step, such as fatigue of the developing liquid.

According to the second aspect of this invention, provided is a process comprising the steps of exposing a region in front of the photographed image areas with a constant quantity of light, developing the region exposed with the constant quantity of light by spraying a developing liquid, detecting the density of the thus developed image in the said region, comparing the thus detected image density with a characteristic curve showing the change in density of exposure light so that the quantity of the sprayed developing liquid is controlled before the photographed image areas are developed. The densities of the developed images in the photographed image areas are thus maintained stably at optimum levels. Continuous development of plural films can be effected. Since the quantity of sprayed developing liquid can be controlled with high fidelity response to the instructions, the density levels of the developed image can be precisely controlled.

According to the third aspect of this invention, provided is a process comprising the steps of exposing a fore end region and an aft end region of a film with a constant quantity of light, developing one of the fore and aft end regions prior to the development of the photographed image areas, detecting the density of the developed image in the region exposed to the constant quantity of light and controlling the condition for developement to an optimum condition before the photographed image areas are developed, whereby the photographed image areas and the other of the regions exposed to the constant quantity of light are developed to have appropriate densities. The quantity of light exposing the photographed image areas at the subsequent printing step is determined by exposing the other of the regions exposed to the constant quantity of light and developed to have an appropriate density prior to the exposure of the photographed image areas. Accordingly, the densities of the developed images in the photographed image areas are thus maintained stably at optimum levels, and the photographed image areas can be developed under an optimum condition to have stable image densities. At the subsequent printing step, the optimum condition for exposure can be determined by using the region exposed to the constant quantity of light and then developed under the optimum condition to have an appropriate density as the standard for the printing operation.

What is claimed is:

1. A process for developing a film having one or more photographed image areas, comprising the steps of:
   (a) exposing a region of said film other than said photographed image areas with a constant quantity of light;
   (b) passing the region exposed with said constant quantity of light to a developing station preceding to said photographed image areas to develop said region exposed with said constant quantity of light;
   (c) detecting the density of the developed image of said region exposed with said constant quantity of light, comparing the thus detected image density with a characteristic curve showing the change in density of the developed image in terms of the quantity of exposure light, and setting the condition for development to an optimum condition based on said characteristic curve; and
   (d) developing said photographed image areas under said optimum condition.

2. The process according to claim 1, wherein said condition for development is controlled by varying the film feed rate.

3. The process according to claim 1, wherein said condition for development is controlled by varying the concentration of the developing reagent in the developing liquid.

4. The process according to claim 1, wherein said condition for development is controlled by varying the quantity of the developing liquid supplied to contact with said film.

5. The process according to claim 1, wherein said condition for development is controlled by changing the temperature of the developing liquid.

6. A process for developing a film having one or more with a constant quantity of light, comprising the steps of:
   (a) passing said at least one region exposed with said constant quantity of light to a developing station preceding to said photographed image areas to develop said at least one region exposed with said constant quantity of light;
   (b) detecting the density of the developed image of said at least one region exposed with said constant quantity of light, comparing the thus detected image density with a characteristic curve showing the change in density of the developed image in terms of the quantity of exposure light, and setting the condition for development to an optimum condition based on said characteristic curve; and
   (c) developing said photographed image areas under said optimum condition.

7. The process according to claim 6, wherein said condition for development is controlled by varying the film feed rate.

8. The process according to claim 6, wherein said condition for development is controlled by varying the concentration of the developing reagent in the developing liquid.

9. The process according to claim 6, wherein said condition for development is controlled by varying the quantity of the developing liquid supplied to contact with said film.

10. The process according to claim 6, wherein said condition for development is controlled by changing the temperature of the developing liquid.

11. A process for developing a film having one or more photographed image areas, comprising the steps of:
 (a) exposing a region of said film other than said photographed image areas with a constant quantity of light;
 (b) passing the region exposed with said constant quantity of light to a developing station preceding to said photographed image areas to develop said region exposed with said constant quantity of light by spraying a developing liquid;
 (c) detecting the density of the developed image of said region exposed with said constant quantity of light, comparing the thus detected image density with a characteristic curve showing the change in density of the developed image in terms of the quantity of exposure light, and setting the condition for development to an optimum condition based on said characteristic curve; and
 (d) developing said photographed image areas by spraying said optimum quantity of said developing liquid onto said film.

12. The process according to claim 11, wherein said developing liquid is sprayed in said step (b) by an ultrasonic wave generating vibrator which is provided in the developing station, and wherein the electric power for actuating said vibrator is controlled to spray said optimum quantity of said developing liquid onto said film.

13. The process according to claim 11, wherein said developing liquid is sprayed in said step (b) through a spray nozzle which is provided in the developing station, and wherein the quantity of the developing liquid sprayed from said nozzle is controlled to spray said optimum quantity of said developing liquid onto said film.

14. A process for developing a film having one or more photographed image areas and at least one region exposed with a constant quantity of light, comprising the steps of:
 (a) passing said at least one region exposed with said constant quantity of light to a developing station preceding to said photographed image areas to develop said region exposed with said constant quantity of light by spraying a developing liquid;
 (b) detecting the density of the developed image of said region exposed with said constant quantity of light, comparing the thus detected image density with a characteristic curve showing the change in density of the developed image in terms of the quantity of exposure light, and setting the condition for development to an optimum condition based on said characteristic curve; and
 (c) developing said photographed image areas by spraying said optimum quantity of said developing liquid onto said film.

15. The process according to claim 14, wherein said developing liquid is sprayed in said step (a) by an ultrasonic wave generating vibrator which is provided in the developing station, and wherein the electric power for actuating said vibrator is controlled to spray said optimum quantity of said developing liquid onto said film.

16. The process according to claim 14, wherein said developing liquid is sprayed in said step (a) through a spray nozzle which is provided in the developing station, and wherein the quantity of the developing liquid sprayed from said nozzle is controlled to spray said optimum quantity of said developing liquid onto said film.

17. A process for developing a film having one or more photographed image areas, and for printing said photographed image areas of the developed film, comprising the steps of:
 (a) exposing a fore end region and an aft end region out of said photographed image areas of said film with a constant quantity of light;
 (b) passing one of said fore end region and said aft end region exposed with said constant quantity of light to a developing station preceding to said photographed image areas to develop said region exposed with said constant quantity of light;
 (c) detecting the density of the developed image of said region exposed with said constant quantity of light, comparing the thus detected image density with a characteristic curve showing the change in density of the developed image in terms of the quantity of exposure light, and setting the condition for development to an optimum condition based on said characteristic curve;
 (d) developing said photographed image areas and the other of said fore end region and said aft end region under said optimum condition; and
 (e) setting an optimum quantity of exposure light at a subsequent printing step based on the density of developed image of said other region exposed with said constant quantity of light.

18. The process according to claim 17, wherein said condition for development is controlled by varying the film feed rate.

19. A process for developing a film having one or more photographed image areas, and for printing said photographed image areas of the developed film, comprising the steps of:
 (a) exposing a fore end region and an aft end region out of said photographed image areas of said film with a constant quantity of light;
 (b) passing one of said fore end region and said aft end region exposed with said constant quantity of light to a developing station preceding to said photographed image areas to develop said region exposed with said constant quantity of light;
 (c) detecting the density of the developed image of said region exposed with said constant quantity of light, comparing the thus detected image density with a characteristic curve showing the change in density of the developed image in terms of the quantity of exposure light, and setting the condition for development to an optimum condition based on said characteristic curve;
 (d) developing said photographed image areas and the other of said fore end region and said aft end region under said optimum condition;
 (e) setting an optimum printing condition at a subsequent printing step based on the density of developed image of said other region exposed with said constant quantity of light; and
 (f) printing said photographed image areas under said optimum printing condition.

20. A process for developing a film having one or more photographed image areas and fore and aft end regions which have been exposed with a constant quantity of light, and for printing said photographed image areas of the developed film, comprising the steps of:
  (a) passing one of said fore end region and said aft end region exposed with said constant quantity of light to a developing station preceding to said photographed image areas to develop said region exposed with said constant quantity of light;
  (b) detecting the density of the developed image of said region exposed with said constant quantity of light, comparing the thus detected image density with a characteristic curve showing the change in density of the developed image in terms of the quantity of exposure light, and setting the condition for development to an optimum condition based on said characteristic curve;
  (c) developing said photographed image areas and the other of said fore end region and said aft end region under said optimum condition; and
  (d) setting an optimum quantity of exposure light at a subsequent printing step based on the density of developed image of said other region exposed with said constant quantity of light.

21. The process according to claim 20, wherein said condition for development is controlled by varying the film feed rate.

22. A process for developing a film having one or more photographed image areas and fore and aft end regions which have been exposed with a constant quantity of light, and for printing said photographed image areas through the developed film, comprising the steps of:
  (a) passing one of said fore end region and said aft end region exposed with said constant quantity of light to a developing station preceding to said photographed image areas to develop said region exposed with said constant quantity of light;
  (b) detecting the density of the developed image of said region exposed with said constant quantity of light, comparing the thus detected image density with a characteristic curve showing the change in density of the developed image in terms of the quantity of exposure light, and setting the condition for development to an optimum condition based on said characteristic curve;
  (c) developing said photographed image areas and the other of said fore end region and said aft end region under said optimum condition;
  (d) setting an optimum printing condition at a subsequent printing step based on the density of developed image of said other region exposed with said constant quantity of light; and
  (e) printing said photographed image areas under said optimum printing condition.

* * * * *